Aug. 22, 1933.    J. D. JONES    1,923,869
MEANS FOR OILING LOOSE PULLEYS OR THE LIKE
Filed June 5, 1930
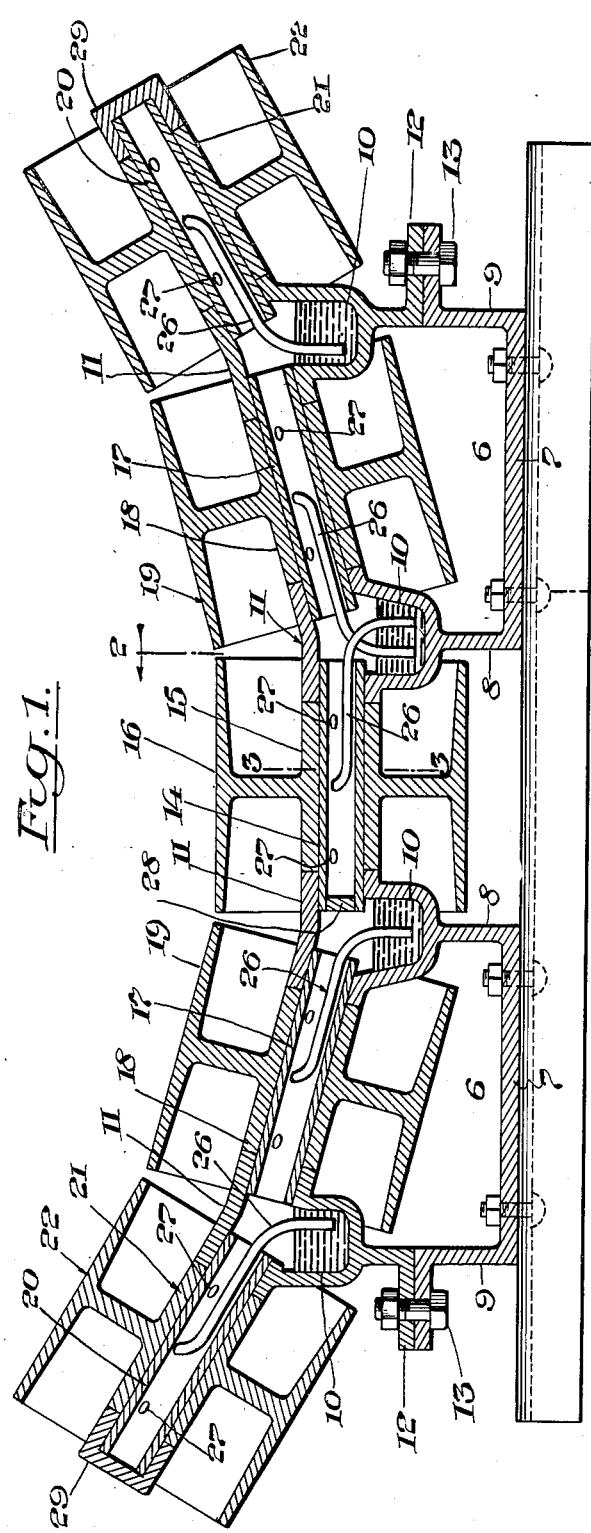
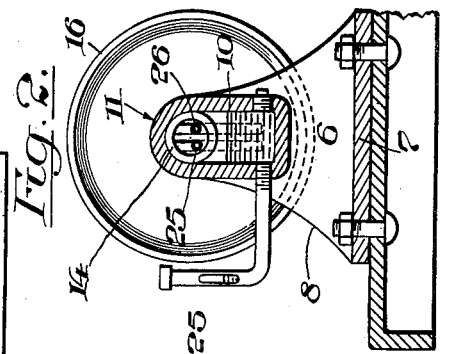
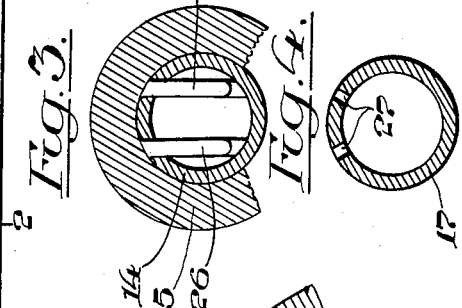
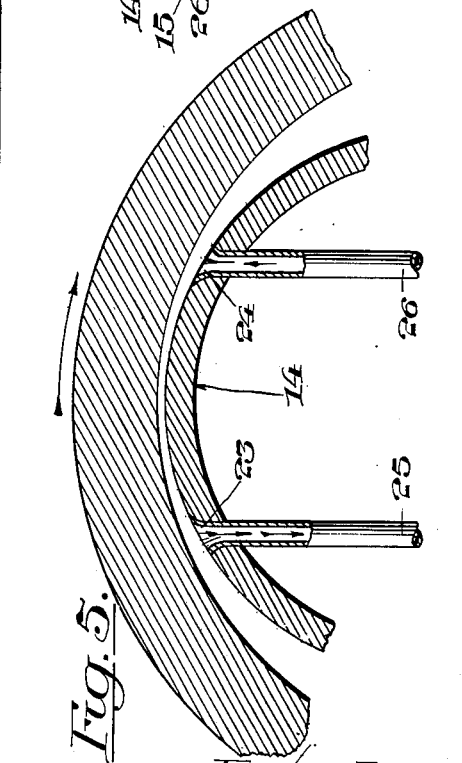
Inventor
John D. Jones
by his Attorney
John R. Nolan Patented Aug. 22, 1933

1,923,869

UNITED STATES PATENT OFFICE 1,923,869

MEANS FOR OILING LOOSE PULLEYS OR THE LIKE

John D. Jones, Portland, Oreg.

Application June 5, 1930. Serial No. 459,271

12 Claims. (Cl. 308—107)

This invention relates to means for oiling the bearing surfaces of loose pulleys and their stationary shafts; the invention being particularly, though not exclusively, designed for use in connection with the pulleys and shafts of a troughing idler for a conveyer belt.

The principal object of my invention is to provide a simple and inexpensive self-contained construction and organization of parts whereby a steady and uniform influx and efflux of oil into and from the oil film space between a rotatable body and the bearing surface of its fixed shaft are effected and maintained during the rotation of the body; the oil circulation being established between the film space and an adjacent oil reservoir in a manner to effect the cooling of the oil in its back and forth flow, as will be hereinafter described; the scope of the invention then being defined in the appended claims.

In the drawing—

Figure 1 is a longitudinal vertical section of a troughing idler equipped with oiling means embodying the principle of my invention.

Fig. 2 is a transverse vertical section in a plane through one of the oil reservoirs, as on the line 2—2 of Fig. 1.

Fig. 3 is a similar section through one of the hollow shafts and a pulley hub in a plane through the complementary oil inlet and oil outlet openings of the shaft, as on the line 3—3 of Fig. 1.

Fig. 4 is a transverse section of a hollow shaft in a plane through drain holes adjacent one end of the shaft.

Fig. 5 is a section of a portion of a pulley hub and its shaft, showing in an exaggerated diagrammatic way the oil film space between the hub and shaft adjacent the maximum bearing surface.

The troughing idler herein illustrated embodies a pair of spaced-apart brackets 6 bolted on a suitable bed. Each of these brackets includes a base 7 and two standards 8, 9, whereof each standard is provided at a suitable level with an oil reservoir 10 surmounted by a double socket 11. The oil reservoir and socket of each of the inner standards 8 are preferably integral with such standard, and the oil reservoir and socket of each of the standards 9 are disposed at a higher level than the inner reservoir and socket and are preferably formed in a section 12 that is detachably bolted, as at 13, to the lower section of the standard 9.

The inwardly extending members of the sockets on the standards 8 are in horizontal axial alignment and are constructed and adapted to support fixedly the respective ends of a hollow shaft 14 upon which the hub 15 of a horizontal pulley 16 is rotatably mounted. The outer member of each of the sockets on the standards 8 and the inner member of each of the sockets on the sections 12 of the standards 9 are slightly inclined and are also in axial alignment so as to receive and fixedly support the respective ends of a hollow shaft 17 upon which the hub 18 of an inclined pulley 19 is rotatably mounted. The outer member of each of the sockets of the sections 12 is inclined at a slightly greater angle than the adjacent member and fixedly supports the end of a shaft 20 upon which the hub 21 of an outer pulley 22 is rotatably mounted. Hence there are five freely rotatable idler pulleys arranged to support a belt in a substantially uniform transverse curve throughout its entire width. It is to be understood, of course, that the number of pulleys may be reduced or increased, as desired.

In the top of each of the hollow shafts, preferably about midway between its ends, are two vertical holes 23, 24, with slightly flaring mouths, which holes are spaced from the respective sides of a plane intersecting the axes of each shaft and its pulley. Leading into the respective holes of each shaft from the adjacent oil reservoir are two tubes or ducts 25, 26 which extend longitudinally through the bore of the shaft and then down into an oil reservoir 10 to a point near the bottom thereof, so that the ends of the ducts within the reservoirs will be below the normal level of the oil in the reservoirs and afford internal ducts for the free circulation of oil between one of the oil reservoirs and the upper or bearing surface of the shaft during the rotation of the pulley.

In the idler construction herein shown two parallel ducts lead from each of the outer reservoirs to the vertical holes of the adjacent outer shaft 20; two parallel ducts lead from each of the adjacent inner reservoirs to the vertical holes of the adjacent inclined shaft 17, and two parallel ducts lead from one of the inner reservoirs to the vertical holes of the horizontal shaft 14.

During the rotation of the pulley, say, in a clockwise direction, as indicated in Fig. 5, the action of the rotating hub on the opposing viscous oil film effects a gradually increasing internal pressure of the oil at the left of the maximum bearing surface and a gradually diminishing pressure at the other side of such surface; the increasing pressure exerting a downward force directly above the vertical oil hole 23, and the diminishing pressure exerting a lifting or suction force directly above the oil hole 24 in such a manner as to produce a steady and uninterrupted circulation of oil between the associated reservoir and the film space, which oil is cooled in its extended travel along the tubes, thereby insuring an efficient lubrication of the bearing surface.

Obviously, if the direction of rotation of the pulley be reversed the varying pressure of the oil in the oil film space will be accordingly reversed in relation to the respective openings 23, 24 of the pulley hub; that is to say, the oil will be admitted through the opening 24 and be ejected through the opening 23.

Each of the fixed shafts is provided with suitably disposed holes, as 27, through which the excess oil on the bearing surface drains into the bore of the shaft, flowing thence to the associated oil reservoir which is below the shaft; it being noted that the end of the horizontal shaft 14 remote from the reservoir with which the ducts of such shaft communicate is provided with a plug 28 to prevent leakage of the oil at that end, and also that the outer ends of the shafts 20 are supplied with dust caps 29.

At no point will the flow of oil be violent in either direction, in or out of the film space, and in consequence a uniform sustained circulation of oil between the reservoir and the bearing surface will be effected during the rotation of the pulley, which oil will be distributed along such surface and the excess will escape through the holes 27 into the bore of the shaft, flowing thence to the associated reservoir, as previously mentioned.

My invention is not limited to the exemplifying form of embodiment thereof herein disclosed, as the construction may be variously modified within the principle of the invention and the scope of the appended claims.

I claim—

1. The combination with a supporting structure, of a fixed shaft having oil inlet and outlet openings spaced from the respective sides of a plane intersecting the axis of the shaft, an element loosely mounted on said shaft, and oil supply circulating ducts communicating with the respective openings internally of the shaft and with the oil supply in such manner that during the rotation of said element a uniform sustained influx and efflux of oil to and from the oil film space between the opposing surfaces of the said shaft and element are effected.

2. The combination with a supporting structure, of a fixed hollow shaft having oil inlet and outlet openings spaced from the respective sides of a plane intersecting the axis of the shaft, an element loosely mounted on said shaft, an oil reservoir below the said shaft, and ducts extending internally of the shaft and affording circulatory communication between the oil reservoir and the respective openings in such manner that during the rotation of said element a uniform sustained influx and efflux of oil to and from the oil film space between the opposing surfaces of the said shaft and element are effected.

3. The combination with a supporting structure, of an oil reservoir, a fixed shaft, a pulley having its hub loosely mounted on the shaft, said shaft having oil inlet and oil outlet openings in its upper portion spaced from the respective sides of a plane intersecting the axis of the shaft, and internal oil ducts extending longitudinally of said shaft from the respective openings to the said reservoir to afford circulatory communication between the contents of the reservoir and the oil film space between the pulley hub and the shaft.

4. The combination with a supporting structure, of an oil reservoir, a fixed hollow shaft, a pulley having its hub loosely mounted on the shaft, said shaft having oil inlet and oil outlet openings in its upper portion spaced from the respective sides of a plane intersecting the axis of the shaft, and tubes extending within and longitudinally of the shaft from the respective openings to the reservoir to afford circulatory communication between the contents of the reservoir and the oil film space between the pulley hub and the shaft.

5. The combination with a supporting structure, of an oil reservoir, a fixed hollow shaft whereof one end leads to the reservoir, a pulley having its hub loosely mounted on the shaft, said shaft having oil inlet and oil outlet openings in its upper portion spaced from the respective sides of a plane intersecting the axis of the shaft, and also having suitably-disposed drain holes, and tubes extending within and longitudinally of the shaft from the respective inlet and outlet openings to the reservoir to afford circulatory communication between the contents of the reservoir and the oil film space between the pulley hub and the shaft.

6. The combination with a supporting structure, of an oil reservoir, a fixed hollow shaft arranged in an inclined position and having its lower end leading to the reservoir, a pulley having its hub loosely mounted on the shaft, said shaft having oil inlet and oil outlet openings in its upper portion spaced from the respective sides of a plane intersecting the axis of the shaft, and also having suitably-disposed drain holes, and tubes extending within and longitudinally of the shaft from the respective inlet and outlet openings to the reservoir to afford circulatory communication between the contents of the reservoir and the oil film space between the pulley hub and the shaft.

7. In an idler for a conveyer belt, a supporting structure, fixed shafts mounted thereon in end to end relation, each of said shafts having oil inlet and oil outlet openings spaced from the respective sides of a plane intersecting the axis of the shaft, pulleys loosely mounted on said shaft, an oil reservoir located below said shafts, and circulating ducts extending internally of two adjacent shafts and affording communication between said reservoir and the respective openings in each shaft.

8. In an idler for a conveyer belt, a supporting structure, fixed hollow shafts mounted thereon in end to end relation, each of said shafts having oil inlet and oil outlet openings spaced from the respective sides of a plane intersecting the axis of the shaft, and also having suitably-disposed drain holes, an oil reservoir located below the adjacent open ends of two shafts, and circulating tubes extending within and longitudinally of the respective shafts and affording communication between said reservoir and the respective openings in each shaft.

9. In an idler for a conveyer belt, a plurality of fixed hollow shafts arranged in angular relation to each other, pulleys loosely mounted on the respective shafts, oil reservoirs arranged in proximity to the adjacent ends of adjoining shafts, each of said shafts having oil inlet and oil outlet openings in its upper portion spaced from the respective sides of a plane intersecting the axis of the shaft, and internal oil ducts extending longitudinally of each shaft from the respective openings to reservoir to afford circulatory communication between the contents of the reservoir and the oil film space between the pulley and the shaft.

10. In an idler for a conveyer belt, a plurality of fixed hollow shafts arranged in angular relation to each other, pulleys loosely mounted on the respective shafts, oil reservoirs arranged in proximity to the adjacent ends of adjoining shafts, each of said shafts having oil inlet and oil outlet openings in its upper portion spaced from the respective sides of a plane intersecting the axis of the shaft, and also having suitably-disposed drain holes, and tubes extending longitudinally of each shaft from the respective openings to a reservoir to afford circulatory communication between the contents of the reservoir and the oil film space between the pulley and the shaft.

11. The combination with a supporting structure, of a fixed shaft, an element loosely mounted on the shaft, and an oil supply below the shaft, there being an oil duct communicating with the space between the shaft and the element mounted thereon on each side of a plane passing through the axis of the shaft and the maximum bearing surface between the said element and the said shaft and the oil supply near the bottom thereof below the normal level of the oil.

12. The combination with a supporting structure, of a fixed shaft, a pulley rotatably mounted on the shaft, and an oil supply below the shaft, there being an oil duct communicating with the space between the shaft and the bore of the pulley, on each side of a plane passing through the axis of the shaft and the maximum bearing surface between the said pulley and the said shaft, and the oil supply near the bottom thereof below the normal level of the oil.

JOHN D. JONES.